United States Patent [19]

Takeuchi et al.

[11] Patent Number: 4,902,359

[45] Date of Patent: Feb. 20, 1990

[54] WEAR-RESISTANT TITANIUM OR TITANIUM-ALLOY MEMBER AND A METHOD FOR MANUFACTURING THE SAME

[75] Inventors: Yukoh Takeuchi, Nagoya; Yoshihisa Kato, Tsushima; Hitoshi Hayakawa, Tohkai; Masaru Nagata; Shinji Nakayama, both of Nagoya, all of Japan

[73] Assignees: Daido Tokushuko Kabushiki Kaisha, Nagoya; Fuji Valve Co., Ltd., Tokyo, both, Japan

[21] Appl. No.: 241,786

[22] Filed: Sep. 6, 1988

Related U.S. Application Data

[63] Continuation of Ser. No. 50,496, May 13, 1987, abandoned.

[30] Foreign Application Priority Data

May 18, 1986 [JP] Japan .................. 61-113165
May 18, 1986 [JP] Japan .................. 61-113166

[51] Int. Cl.⁴ ............................................. C22C 14/00
[52] U.S. Cl. ................................... 148/133; 148/903; 148/421
[58] Field of Search .............. 148/4, 421, 902, 903, 148/133; 219/121 P, 121 PA, 121 PB, 121 Pl

[56] References Cited

U.S. PATENT DOCUMENTS

| | | | |
|---|---|---|---|
| 3,963,525 | 6/1976 | Bomberger, Jr. et al. | 148/2 |
| 4,104,505 | 8/1978 | Rayment et al. | 219/121 PL |
| 4,157,923 | 6/1979 | Yen et al. | 148/4 |
| 4,695,329 | 9/1987 | Hayashi et al. | 148/4 |

FOREIGN PATENT DOCUMENTS

| | | | |
|---|---|---|---|
| 0062365 | 10/1982 | European Pat. Off. . | |
| 0107419 | 5/1984 | European Pat. Off. . | |
| 56-150183 | 11/1981 | Japan . | |
| 60-92460 | 5/1985 | Japan . | |
| 60-92461 | 5/1985 | Japan . | |
| 2056561 | 3/1987 | Japan | 148/133 |

*Primary Examiner*—S. Kastler
*Attorney, Agent, or Firm*—Frishauf, Holtz, Goodman & Woodward

[57] ABSTRACT

A wear-resistant titanium or titanium-alloy member adapted for use as a poppet valve, rocker arm, etc., of an internal combustion engine, which requires lightness in weight and good wear resistance, and a method for manufacturing the member. The surface of the titanium or titanium-alloy member is given a Vickers hardness number of 390 to 1,200, preferably 400 to 800, and a hardened layer depth of 0.1 to 2.0 mm, preferably 0.3 to 1.5 mm, by being melt-hardened while being supplied with hardening elements.

15 Claims, 2 Drawing Sheets

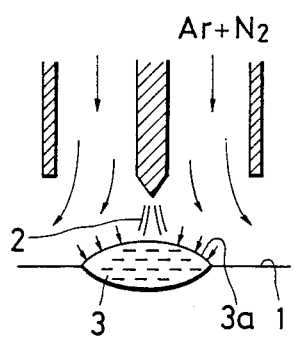
FIG.1
PRIOR ART
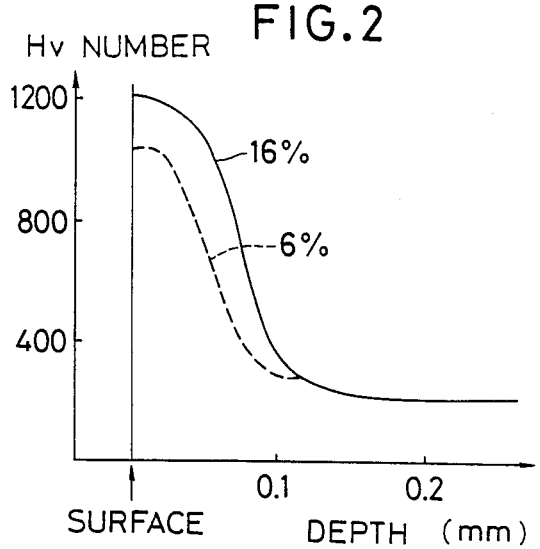
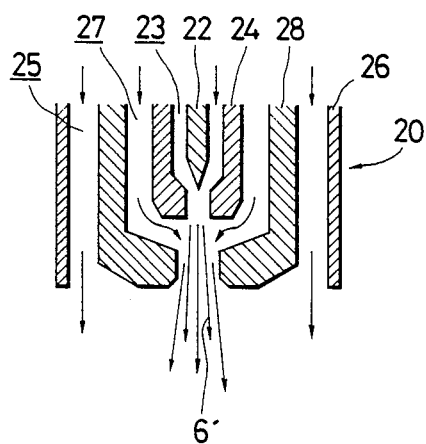
FIG.4
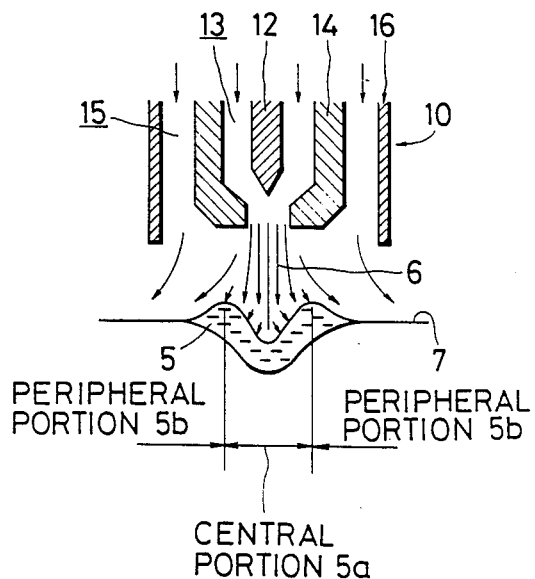
FIG.3

WEAR-RESISTANT TITANIUM OR TITANIUM-ALLOY MEMBER AND A METHOD FOR MANUFACTURING THE SAME

This application is a continuation of application Ser. No. 07/050,496, filed May 13, 1987 abandon.

BACKGROUND OF THE INVENTION

The present invention relates to a wear-resistant titanium or titanium-alloy member and a method for manufacturing the same, and more particularly to a member, such as a poppet valve, rocker arm, piston pin, or the like of an internal combustion engine, which requires lightness in weight and good wear resistance, and a method for manufacturing such a member.

Poppet valves, rocker arms, piston pins, etc., used in internal combustion engines of automobiles and the like are expected to be reduced in weight, in order to improve the fuel economy and the responsivnness of the engines during acceleration or deceleration, and to lower the level of noise. Materials used for these members include lightweight, heat-resistant titanium alloys, such as a Ti-6Al-4V alloy. To maintain the desired engine life, the titanium-alloy members have tentatively been surface-hardened, for higher wear resistance, by plasma spraying of hardening build-up material, ion-nitriding, work-hardening, etc.

According to the plasma-spraying method, however, the poor cohesiveness between the hardening build-up layer and the base material may lead to a possible cracking and/or separation at the interface. The method of ion-nitriding, which is free from such cracking or separation of the build-up layer, cannot provide a hardened layer of a required thickness. By the work-hardening method, moreover, a satisfactory member life cannot be ensured.

Stated in Japanese Provisional Patent Publication No. 56-150183, for example, is a method in which the surface of a titanium-alloy member is melt-hardened by means of a DC TIG arc in a gas-mixture atmosphere containing nitrogen and an inert gas, such as argon. This method, as compared with the ion-nitriding method described above, can provide a thicker hardened layer. By this prior art method, however, some members still cannot be given a satisfactory hardened layer depth. When this method is applied to an engine poppet valve of a automobile engine, in order to harden its valve face to be seated on a valve seat, for example, an allowance for final machining must be secured to shape the surface of a melt-hardened layer. In consideration of such an allowance, the hardened layer depth provided by the conventional melt-hardening method is not thick enough. Therefore, if the melting state of the valve face is maintained for a long period of time to obtain a desired hardened layer thickness by this method, the so-called welding damage occurs, and hence leads to an improper member surface. If the melt-hardening operation on the valve face is repeated to obtain a desired hardened layer depth, moreover, the manufacturing cost will inevitably increase.

OBJECTS AND SUMMARY OF THE INVENTION

A primary object of the present invention is to provide a wear-resistant titanium or titanium-alloy member with a required hardness and a good hardened layer depth, thus ensuring a satisfactory life performance.

Another object of the invention is to provide a method for manufacturing a wear-resistant titanium or titanium-alloy member with a required hardness and a good hardened layer depth, without entailing any pinholes or separation.

Still another object of the invention is to provide a method for manufacturing a wear-resistant titanium or titanium-alloy member with a required hardness and a good hardened layer depth, in a relatively short period of time and at low cost.

According to the present invention, there is provided a wear-resistant member made of a material selected from the group consisting of titanium and titanium-alloy, which has a melt-hrdened surface with a Vickers hardness number of 390 to 1,200, preferably 400 to 800, and a hardened layer depth of 0.1 to 2.0 mm, preferably 0.3 to 1.5 mm.

As a method for manufacturing such a wearresistant member, according to the invention, there is provided a method which comprises a step of melt-hardening the surface of a member made of a material selected from the group consisting of titanium and titanium-alloy, while applying hardening elements to the elements to the surface of the member.

In the method of melt-hardening, the titanium or titanium-alloy member is melt-hardened preferably by spraying the surface of the member with a plasma jet containing, as a working gas, a gas mixture of an inert gas and a hardening gas. The hardening gas is formed of one or more gases selected from the group consisting of nitrogen, carbon dioxide, carbon monoxide, oxygen, methane, and ammonia. If the hardening gas is nitrogen, the gas mixture contains it at a rate of 0.1 to 20% by volume. If the hardening gas is carbon monoxide, the gas mixture contains it at a rate of 30% or less by volume. If the hardening gas is carbon dioxide, moreover, the gas mixture contains it at a rate of 20% or less by volume.

Preferably, the plasma jet is sprayed by means of a torch including a center electrode, a first passage surrounding the center electrode, and a second passage surrounding the first passage, the first passage being supplied with the working gas, and the second passage being supplied with a shielding gas containing an inert gas and a hardening gas. The torch may further include a third passage defined between the first and second passages so as to surround the first passage. In this case, the first passage is supplied with a first gas mixture, as a working gas, containing at least the inert gas, while the third passage is supplied with a second gas mixture containing at least the hardening gas, so that the second gas mixture is caused to join a plasma jet produced in the first passage.

Preferably, moreover, the hardening gas of the second gas mixture is oxygen.

In another preferred aspect of the melt-hardening method, hardening alloy elements are applied to the surface of the titanium or titanium-alloy member, and the member surface is melt-hardened together with the hardening alloy elements.

In still another preferred aspect of the melt-hardening method, hardening alloy elements are applied to the surface of the titanium or titanium-alloy member, and the member surface is melt-hardened together with the hardening alloy elements, while being sprayed with a hardening gas.

Preferably, furthermore, the hardening alloy elements are formed of one or more elements selected from the group consisting of aluminum(Al), tin(Sn), boron(B), iron(Fe), chromium(Cr), nickel(Ni), manganese(Mn), copper(Cu), silicon(Si), silver(Ag), tungsten(W), molybdenum(Mo), vanadium(V), niobium(Nb) or columbium(Cb), tantalum(Ta), and zirconium(Zr). Also, titanium(Ti) or at least one of compounds including a carbide, a nitride, and an oxide may be mixed with the hardening alloy elements, and the resulting mixture is applied to the member surface.

The above and other objects, features, and advantages of the invention will be more apparent from the ensuing detailed description of exemplary embodiments thereof taken in connection with the accompanying drawings.

BRIEF DESCRIPTION OF THE DRAWINGS

FIG. 1 is a schematic sectional view showing a melting state of a member surface provided by a prior art melt-hardening method;

FIG. 2 is a graph showing the relationships between the depth from the member surface and the Vickers hardness number obtained when nitrogen gas, for use as a hardening gas, is supplied only to a second passage or shielding-gas passage of a plasma-arc torch, thereby melt-hardening the member surface;

FIG. 3 is a schematic sectional view showing a melting state of a member surface provided by a melt-hardening method according to the present invention;

FIG. 4 is a sectional view showing a principal part of a modification of a plasma-arc torch used to effect the method of the present invention;

DETAILED DESCRIPTION

Figure 5:
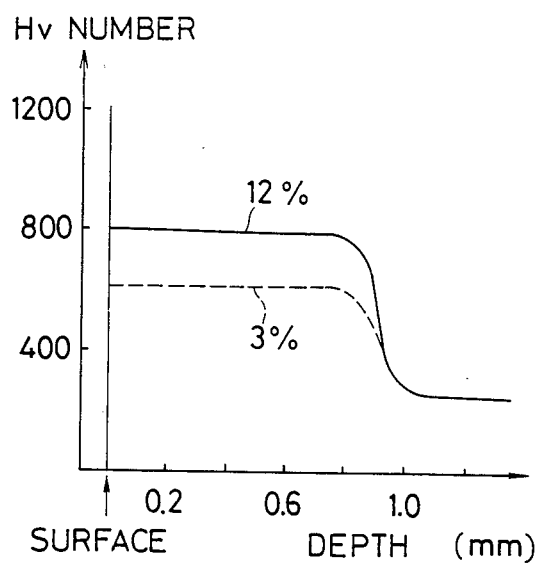
FIG. 5 is a graph showing the relationships between the depth from the member surface and the Vickers hardness number obtained when the member is melt-hardened by the method of the invention.

FIG. 1 illustrates a method for manufacturing a wear-resistant titanium-alloy member, based on the conventional melt-hardening process. According to this method, a surface 1 of a member, made of a titanium alloy, is melt-hardened in a gas-mixture atmosphere containing nitrogen and an inert gas, such as argon, by means of a DC TIG (direct current tungsten-inert gas) arc 2.

In the conventional melt-hardening process shown in FIG. 1, nitrogen gas penetrates the titanium-alloy member, heated and melted by the TIG arc or the like, only through a surface 3a of a molten pool 3. Thus, the nitrogen gas cannot easily penetrate deep into the surface layer of the alloy member, through the surface 3a, within a short period of melting time. The present invention is based on an understanding that hardening elements such as nitrogen, for example, can be made to penetrate deep into the surface layer not only by heating the molten pool, but also by rippling and roughing the surface of the molten pool so that the hardening elements penetrate through the rugged surface.

More specifically, a plasma jet of a high temperature (6,000° C. or more) is sprayed on the surface of a member made of titanium or a titanium alloy, e.g., Ti-6Al-4V, Ti-6Al-4V-4Mo, Ti-40Al-2Mo, etc., at high speed (100 m/sec or more), using, as a working gas, a gas mixture of an inert gas, such as argon or helium, and one or more hardening gases selected from a group including at least nitrogen, carbon dioxide, carbon monoxide, oxygen, methane, and ammonia. Thereupon, the surface of the alloy member is heated and melted by the plasma jet in a short period of time. Also, a central surface 5a of a molten pool 5 is depressed and rippled by a plasma jet 6, as shown in FIG. 3. Thereupon, the ionized hardening elements, including nitrogen, carbon, oxygen, etc. in the plasma jet, by being involved in the swollen and rippled surface of the molten pool, penetrate deep into the molten metal through the surface layer, thus diffusing uniformly throughout the molten metal. When the metal solidifies, a hardened layer is formed having a uniform Vickers hardness number (Hv-number) throughout the melted metal layer. The depth of the melted layer depends on the amount of heat or welding current applied to the molten pool, the welding speed, and other welding parameters. Therefore, the thickness of the melted layer, i.e., that of the hardened layer, can be controlled to a desired value by suitably setting those values.

Meanwhile, the hardness of the hardened layer is proportional to the quantity of the hardening elements penetrating the molten pool 5, and such quantity in turn is proportional to the amount of the hardening gas in the working gas. Thus, the Hv-number of the hardened layer can be adjusted to a desired value by suitably setting the amount of the hardening gas in the working gas.

The plasma jet is spouted from a conventional plasma-arc torch (hereinafter referred to simply as torch) 10, as shown in FIG. 3, toward a member surface 7. The torch 10 has a tungsten electrode 12 in the center. Inner and outer torch cylinders 14 and 16 are arranged coaxially around the electrode 12. The electrode 12 and the cylinders 14 and 16 are spaced at predetermined distances from one another. An annular working-gas passage 13, as a first passage, is defined between the electrode 12 and the inner cylinder 14. An annular shielding-gas passage 15, as a second passage, is defined between the inner and outer cylinders 14 an 16. The working gas is fed into the working gas passage 13, and is sprayed, in the form of the high-temperature, high-speed plasma jet 6, to the surface of the molten pool 5, mainly to the central surface portion 5a thereof. On the other hand, an inert gas (shielding gas), such as argon or helium, is fed into the shielding-gas passage 15. The shielding gas serves to shield the plasma jet 6 spouting from the working-gas passage 13, and the surface of the molten pool (weld) 5, especially a peripheral surface portion 5b thereof, from the atmospheric environment.

The shielding gas fed into the shielding-gas passage 15 may be mixed, as required, with a hardening gas, such as nitrogen gas. Part of the nitrogen gas in the shielding gas penetrates the molten metal through the peripheral surface portion 5b of the molten pool 5, thereby contributing to the formation of the hardened layer.

A torch 20 shown in FIG. 4 may be used in place of the torch 10 shown in FIG. 3. First and second inner torch cylinders 24 and 28 and an outer torch cylinder 26 are arranged successively, in a coaxial manner, around a central tungsten electrode 22 of the torch 20. These cylinders are spaced t predetermined distances from the electrode 22 and from one another. A first annular passage or working-gas passage 23 is defined between the electrode 22 and the first inner cylinder 24, while a second annular passage or shielding-gas passage 25 is defined between the second inner cylinder 28 and the outer cylinder 26. A third annular passage 27 is defined between the first and second inner cylinders 2 and 28. The third passage 27 is bent radially inward at its outlet portion. The working gas jetting from the third passage 27 joins a plasma jet 6' produced in the working-gas passage 23, and the resulting jet spouts from the torch 20. The working-gas passage 23 is supplied with a first gas mixture, as the working gas, containing an inert gas or a combination of an inert gas and a hardening gas. In other words, the firs gas mixture contains at least an inert gas. On the other hand, the third passage 27 is supplied with a second gas mixture which contains a hardening gas or a combination of an inert gas, such as argon, and a hardening gas. In short, the second gas mixture contains at least a hardening gas. As mentioned before, nitrogen, carbon monoxide, or carbon dioxide may be used as the hardening gas constituting the second gas mixture. Preferably, however, oxygen gas is selected for this purpose. If oxygen gas, which is known as an effective hardening gas, is fed into the working-gas passage 23, the tungsten electrode 22 is oxidized and dissipated substantially. Therefore, the use of oxygen gas as the hardening gas has been restricted. However, oxygen gas can be supplied to the third passage 27 without entailing any such awkward situation. Thus, oxygen gas can be used satisfactorily as the hardening gas. The shielding-gas passage 25 of the torch 20 of FIG. 4 may be supplied only with an inert gas, such as argon, or with a mixture of such an inert gas and a hardening gas, such as nitrogen gas.

The plasma jet may be produced either by means of a plasma-arc torch, which generates a plasma arc in the aforementioned manner, or by means of a plasma-jet torch which generates a plasma jet.

The present invention may be applied suitably, for example, to suction and/or exhaust valves of automobile engines, rocker arms, retainers, lifter valves, piston pins, and other members. If the mixture ratio of the hardening gases, welding current, and welding speed are adjusted suitably, depending on the applied members, the resulting products suffer less voids, and are improved in cohesion property. Also, the Hv-number and the hardened layer depth can be adjusted to desired values within predetermined ranges, the former ranging from 390 to 1,200, preferably from 400 to 800, and the latter ranging from 0.1 to 2.0 mm, preferably from 0.3 to 1.5 mm.

In consideration of economical efficiency and easiness of handling, one or more gases, selected from a group including nitrogen, carbon monoxide, and carbon dioxide, are used as the hardening gas or gases. If only the carbon monoxide is used as the hardening gas, its mixture ratio to the gas mixture (mixture of inert gas and hardening gas) is preferably 30% or less by volume. If only the carbon dioxide is used, its mixture ratio is preferably 20% or less by volume. If only the nitrogen gas is used, its mixture ratio preferably ranges from 1 to 20% by volume. If a mixture of nitrogen gas, and carbon dioxide and/or carbon monoxide is used for the purpose, the total mixture ratio of these hardening gases preferably ranges from 1 to 50% by volume. If the hardening gas or gases are used excessively in the gas mixture, exceeding those upper limits, the Hv-number increases unduly, and the surface of a weld bead is deteriorated in shape. If the mixture ratio is less than the lower limits, the welding time necessary to obtain a hardened layer with a desired hardness becomes longer, thereby entailing a welding damage.

After the melt-hardening process according to the present invention, the member can be heated for heat treatment or forging without changing the hardness characteristic of the melt-hardened region. After the hardening process, moreover, unhardened regions of the member surface may be hardened by ion-nitriding, gas-nitriding, plasma spraying, surface oxidation, plating, etc.

In the melt-hardening process, moreover, the member to be treated may be moved relatively to the torch by rotation or the like so that desired regions are melt-hardened. Alternatively, the torch may be moved with the member fixed. When the member is movable, melting of the member surface and penetration of the hardening gas may be facilitated by oscillating the torch at right angles to the moving direction of the member, thereby further rippling the surface of the molten pool.

TABLE 1

| Test No. | Working Gas Ar l/min | Working Gas $N_2$ l/min | Shielding Gas Ar l/min | Shielding Gas $N_2$ l/min | Welding Speed mm/sec | Welding damage | Bead Shape | Depth of Wear ($\mu$m) |
|---|---|---|---|---|---|---|---|---|
| 1 | 0.7 | 0.1 (12) | 15 | — | 15 | nil | Good | 1.0 |
| 2 | 0.7 | 0.022 (3) | 15 | — | 15 | nil | Good | 1.5 |
| 3 | 0.7 | — | 15 | 1.0 (6) | 15 | nil | Good | Cracked after 1.0 hour |
| 4 | 0.7 | — | 15 | 3.0 (16) | 15 | nil | Good | Cracked after 0.5 hour |
| 5 | 0.7 | — | 7.5 | 7.5 (50) | 15 | nil | Poor | — |
| 6 | 0.7 | — | 15 | 1.0 (6) | 5 | observed | Poor | — |

Numbers in parentheses indicate nitrogen contents (%) by volume.

The present invention will be further illustrated by way of the following Examples.

EXAMPLE 1

Table 1 shows welding conditions used in a melt-hardening method according to the present invention, which is applied to rocker arms of automobile engines, and the member hardening characteristics. The tip end portion of each rocker arm was subjected to a surface-hardening process under the various welding conditions shown in Table 1. The Vickers hardness number (Hvnumber) distributions at various depths from the surfaces of individual sample members were measured. Also, the sample members were mounted on an engine with a valve made of SUH-36 (equivalent to SAE EV8) having a shaft-end Hv-number of 400. Then, the depths of wear of the members were measured and compared after 200 hours of running under the same running test conditions. A load of 5 kgf was employed in the aforesaid Vickers hardness measurement. A welding current of 90 A was supplied between the torch and each sample member, thereby producing a plasma arc. The plasma arc was sprayed on the tip end portion of the member to melt-harden it.

In the method of the present invention shown in Table 1, nitrogen gas as the hardening gas was mixed with the working gas, whereas in the method employed for comparison, nitrogen gas was added only to the shielding gas, and not to the working gas.

In sample members treated according to the present invention (Test Nos. 1 and 2) no welding damage occurred and good bead shapes were observed. The sample member (Test No. 1) tested with use of the working gas containing 12% nitrogen gas by volume, as shown in FIG. 5, exhibited an Hv-number of about 800 and a hardened layer depth of about 0.9 mm. The sample member (Test No. 2) tested with use of the working gas containing 3% nitrogen gas exhibited an Hv-number of about 600 and a hardened layer depth of about 0.9 m. In both cases, substantially uniform Hv-number levels were obtained through the whole hardened layers, and hardness levels corresponding to the mixture ratio of the hardening-gas mixture were obtained. The depths of wear after 200 hours of running test were 1.5 μm or less. Comparison of the wear depths with hardened layer depths (see FIG. 5) which are obtained by the method of the present invention indicates that the sample members have a sufficiently long lives.

On the other hand, those sample members (Test Nos. 3 and 4) according to the method for comparison, tested with use of the shielding gases whose nitrogen contents are 6% and 16%, respectively, suffered no welding damage, and showed good bead shapes. However, although the Hv-number of the outermost layer portion of these members ranges from 1,200 to 1,500, as shown in FIG. 2, the thickness of the hardened layer portion with an Hv-number of 400 or greater is only 0.1 mm or less. Thus, the outermost layer portion was so excessively harder than the remaining hardened layer that Nos. 3 and 4 sample members cracked after one hour, and 30 minutes of engine running test, respectively, thereby proving to be unpractical.

Another sample member (Test No. 5) tested with use of the shielding gas containing 50% nitrogen gas showed a poor bead shape. Still another sample member (Test No. 6), which was melt-hardened with use of the shielding gas containing 6% nitrogen gas and a welding speed of 5 mm/sec—one-third of that for the foregoing samples (Test Nos. 1 to 5)—suffered a welding damage as well as a poor bead shape. In this manner, both Nos. 5 and 6 sample members proved unpractical.

Thus, according to the melt-hardening method of the present invention, the plasma jet containing the hardening gas is sprayed on the central surface portion 5a of the molten pool 5, as shown in FIG. 3, thereby facilitating the penetration of the hardening gas throughout the molten metal. According to the method employed for comparison, however, the shielding gas, containing the hardening gas, is sprayed on the peripheral surface portion 5b of the molten pool 5, so that the hardening gas penetrates only the surface region of the molten pool. As a result, only the surface region can be hardened.

EXAMPLE 2

Table 2 shows welding conditions used in the melt-hardening method according to the present invention, which is applied to exhaust valves of automobile engines, and the member hardening characteristics. The portion of the valve face of each engine exhaust valve which is to be in contact with the valve seat was subjected to a melt-hardening process.

TABLE 2

| Test No. | First Working Gas 0.8 l/min | Second Working Gas l/min | Shielding Gas 15 l/min | Valve Material | Current (A) | Surface | | | | | 0.5 | | | | | 1.0 | | mm | Depth of Wear μm | Remarks Valve Seat |
|---|---|---|---|---|---|---|---|---|---|---|---|---|---|---|---|---|---|---|---|---|
| 8 | Ar + 0.1% N$_2$ | — | Ar | a | 75 | 401 | 397 | 395 | 403 | 398 | 393 | 359 | 349 | 326 | 335 | 362 | 349 | 338 | 7 | Be—Cu |
| 9 | Ar + 0.3% N$_2$ | — | Ar | a | 75 | 410 | 424 | 421 | 418 | 417 | 411 | 403 | 374 | 339 | 361 | 353 | 366 | 372 | 4 | Be—Cu |
| 10 | Ar + 1.5% N$_2$ | — | Ar | b | 80 | 423 | 435 | 424 | 429 | 431 | 430 | 424 | 422 | 419 | 366 | 377 | 374 | 362 | 2 | Be—Cu |
| 11 | Ar + 5.0% N$_2$ | — | Ar | a | 75 | 485 | 483 | 510 | 516 | 497 | 480 | 369 | 362 | 370 | 339 | 355 | 366 | 374 | 3 | Stellite #1 |
| 12 | Ar + 10.0% N$_2$ | — | Ar | a | 75 | 759 | 763 | 754 | 752 | 756 | 764 | 349 | 372 | 341 | 352 | 326 | 378 | 373 | 0 | Ti (Surface-hardened) |
| 13 | Ar + 20.0% N$_2$ | — | Ar | a | 75 | 1130 | 1141 | 1108 | 1105 | 1094 | 890 | 370 | 377 | 378 | 372 | 361 | 370 | 359 | 0 | Ti (Surface-hardened) |
| 14 | Ar | N$_2$: 0.013(1.6) | Ar | a | 75 | 430 | 428 | 418 | 422 | 425 | 424 | 421 | 352 | 330 | 364 | 372 | 353 | 362 | 1 | Be—Cu |
| 15 | Ar | Ar:2, N$_2$:0.01(0.3) | Ar | a | 75 | 405 | 403 | 401 | 410 | 401 | 409 | 408 | 341 | 362 | 372 | 371 | 370 | 335 | 6 | Be—Cu |
| 16 | Ar + 2.0% N$_2$ | — | Ar + 20% N$_2$ | a | 75 | 485 | 464 | 459 | 448 | 437 | 434 | 372 | 376 | 377 | 341 | 372 | 370 | 371 | 1 | ST #6 |
| 17 | Ar + 2.0% N$_2$ | — | Ar | a | 85 | 450 | 455 | 442 | 440 | 449 | 441 | 446 | 451 | 450 | 447 | 353 | 372 | 366 | 2 | ST #6 |
| 18 | Ar + 0.3% N$_2$ | — | Ar | a | 85 | 409 | 412 | 414 | 413 | 411 | 411 | 406 | 404 | 415 | 405 | 406 | 361 | 373 | 6 | ST #6 |
| 19 | Ar + 2.0% N$_2$ | — | Ar | a | 65 | 451 | 450 | 449 | 448 | 451 | 349 | 376 | 378 | 353 | 370 | 361 | 530 | 352 | 2 | Be—Cu |
| 19' | Ar + 2.0% N$_2$ | — | Ar | d | 75 | 430 | 418 | 431 | 425 | 418 | 427 | 422 | 425 | 259 | 280 | 276 | 290 | 285 | 1 | Be—Cu |
| 20 | Ar + 30% N$_2$ | — | Ar | a | 75 | 1413 | 1510 | 1209 | 1358 | 1354 | 1356 | 371 | 374 | 359 | 377 | 348 | 351 | 369 | — | Poor bead surface integrity |
| 21 | Ar + 0.05% N$_2$ | — | Ar | a | 75 | 385 | 383 | 391 | 385 | 384 | 379 | 376 | 370 | 369 | 337 | 355 | 353 | 364 | 51 | Be—Cu |
| 22 | Ar | — | Ar + 20% N$_2$ | a | 75 | 424 | 388 | 371 | 374 | 359 | 377 | 372 | 357 | 362 | 340 | 349 | 352 | 365 | 318 | Be—Cu |
| 23 | Ar | — | Ar + 50% N$_2$ | a | 75 | 752 | 395 | 358 | 381 | 372 | 365 | 356 | 347 | 355 | 352 | 364 | 352 | 361 | 324 | Be—Cu |
| 24 | Ar | — | Ar + 22% N$_2$ | b | 80 | 429 | 377 | 372 | 372 | 362 | 370 | 366 | 372 | 371 | 359 | 370 | 364 | 360 | 303 | Be—Cu |

TABLE 2-continued

| Test No. | First Working Gas 0.8 l/min | Second Working Gas l/min | Shielding Gas 15 l/min | Valve Material | Current (A) | Hardness Distribution (Vickers hardness number; 1 kg load) Surface / 0.5 / 1.0 mm | | | | | | | | | | | Depth of Wear μmm | Remarks Valve Seat |
|---|---|---|---|---|---|---|---|---|---|---|---|---|---|---|---|---|---|---|
| 25 | Ar | Methane 0.2 (20.0) | Ar | a | 75 | 455 | 449 | 451 | 446 | 451 | 448 | 372 | 374 | 359 | 372 | 362 | 341 | 372 | 2 | Stellite #6 |
| 26 | Ar | Co 0.25(23.8) | Ar | a | 75 | 484 | 489 | 479 | 483 | 478 | 481 | 357 | 341 | 366 | 361 | 370 | 373 | 377 | 3 | Stellite #1 |
| 27 | Ar + 2.0% N₂ | CO 0.1 (11.1) | Ar | a | 75 | 510 | 513 | 509 | 507 | 511 | 519 | 366 | 353 | 371 | 374 | 355 | 340 | 353 | 1 | Stellite #1 |
| 28 | Ar + 1.75% N₂ | — | Ar | c | 75 | 464 | 458 | 463 | 456 | 471 | 454 | 396 | 401 | 488 | 393 | 400 | 389 | 412 | 1 | Stellite #6 |

Numbers in parentheses indicate percentages by volume.

In the tests shown in Table 2, a Ti-6Al-4V alloy was used for valves (a), whose head diameter was 25 mm. For the valves (a), the welding speed was kept at a constant speed of 9.2 mm/sec, and the welding current was varied in three levels, 85, 75, and 65 A. A Ti-6Al-4V-4Mo alloy was used for valve (b), whose head diameter was 36 mm. The valves (b) were tested with use of a welding speed of 8.7 mm/sec and a welding current of 80 A. A Ti-40Al-2Mo alloy was used for valves (c), whose head diameter was 25 mm. The valve (c) was tested with use of a welding speed of 9.2 mm/sec and a welding current of 75 A. Essentially pure titanium was used for valve (d), whose head diameter was 25 mm. The valve (d) was tested with use of a welding speed of 9.2 mm/sec and a welding current of 75 A. For all the valves (a), (b), (c), and (d), a watercooled copper backing was fixed tightly to the valve head, and the welding current, varied between the aforesaid three levels, was supplied between the torch and the copper backing.

The torch used has the configuration shown in FIG. 4. The working-gas passage 23 was supplied with first working gases (first gas mixtures) of the mixture ratios shown in Table 2, at a flow rate of 0.8 l/min. The shielding-gas passage 25 was supplied with shielding gases of the mixture ratios shown in Table 2, at a flow rate of 15 l/min. The third passage 27 was supplied with second working gases (second gas mixtures) of compositions shown in Table 2.

After the individual sample members were melt-hardened by the method of the invention or by the method for comparison, Hv-numbers at various depths from the member surfaces were measured. These measured values are tabulated in a hardness distribution column in Table 2. Underlined figures in the tabulated hardness numbers represent the hardness of those portions melted during the melt-hardening process. Thus, the melt depth can be determined by the length of each underline. A load of 1 kgf was used in the Vickers hardness test.

The individual valves, after the melt-hardening process, were actually mounted on the test engines, and 100-hour endurance tests were conducted at 3,000 rpm of the camshaft and with 4/4 load (i.e. full load). After the engine tests, the depths of wear of the valve faces were measured and compared. Each test engine was equipped with a valve seat which has a hardness corresponding to the surface hardness of the valve face of the sample valve mounted thereon. The materials of the valve seats are described in the remarks of Table 2.

As in the case of Example 1, those sample members (Test Nos. 22 to 24) according to the method for comparison, tested with nitrogen gas mixed only the shielding gas, increased their surface hardness as the nitrogen content increased (see Test Nos. 22 and 23). In these cases, however, only the outermost layer portion became extremely hard, and the Hv-number decreased drastically with distance from the outermost layer. The thickness of the hardened layer obtained was at most 0.1 mm or thereabout, which is much smaller than the melt depth. Therefore, if a machining allowance of about 0.2 mm is considered, then the obtained hardened layer depth is not sufficient at all. In consequence, the depth of wear after 100 hours of endurance running test was as great as 303 to 324 μm, thus revealing the unpracticality of the sample members.

Meanwhile, the hardened layer depth of the sample members according to the method of the present invention was substantially equal to the melt depth obtained in the melt-hardening process. In contrast with the cases of the method for comparison, therefore, a substantially uniform Hv-number distribution was provided in the whole hardened region (see Test Nos. 10 and 24).

As the nitrogen content in the working gas was increased, the Hv-number increased (Test Nos. 8, 9, 11, 12, 13, 20 and 21), although the hardened layer depth was substantially same. When the nitrogen content in the working gas was within the range from 0.1 to 20% by volume, provided according to the present invention, the Hv-numbers of the sample members were found to range between about 390 and 1,140, in proportion to the nitrogen content (Test Nos. 8 to 13). Thus, within the aforesaid range, the hardness of the members can be controlled by suitably changing the nitrogen content.

When the nitrogen content exceeded the predetermined range of the invention (Test No. 20), however, the Hv-number at the outermost surface portion was found to take an unduly high value of about 1,400, and the bead surface was deteriorated in shape. When the nitrogen content was smaller than the lower limit of the invention (Test No. 21), the hardness of the sample member was not sufficient, and the depth of wear observed after 100 hours of engine running test was as great as 50 μm, as compared with values of 0 to 7 μm for the sample members (Test Nos. 8 to 13, and 19') tested according to the method of the invention.

When the welding current was changed, with the nitrogen content in the first working gas kept at about 2.0% by volume, the Hv-number of the surface region was substantially constant at 450. As the current value increased, however, the hardened layer depth increased correspondingly (Test Nos. 17 and 19). Thus, the hardened layer depth can be controlled by changing the welding current while keeping the nitrogen content at a constant value.

Sufficient hardness and hardened layer depth was able to be obtained also by supplying nitrogen gas to the third passage 27, and then causing the gas to flow together with the plasma jet in the working-gas passage 23, instead of mixing the nitrogen gas in the first working gas (see Test Nos. 14 and 15). The outermost layer portion was able to be made somewhat harder than the deeper region, by only mixing a suitable amount of nitrogen gas also in the shielding gas. A sample member (Test No. 16) melt-hardened in this manner exhibited an acceptable depth of Wear of about 1 μm after 100 hours of engine running test.

Sample members (Test Nos. 25, 26 and 27) tested with use of methane or carbon monoxide in place of nitrogen gas, as the hardening gas, showed substantially uniform Hv-number distributions and hardened layer depths throughout the melted regions.

Sample member (valve (c); Test No. 28) made of a Ti-40Al-2Mo alloy with a higher aluminum content provided a hardness distribution and a depth of wear similar to those obtained with use of sample members made of other alloys.

TABLE 3

| Test No. | First Working Gas 1.2 l/min | Second Working Gas l/min | Shielding Gas 20 l/min | Current (A) | Hardness Distribution (Vickers hardness number; 1 kg load) | | | | | | | | | | | | | | | | Depth of wear μm |
|---|---|---|---|---|---|---|---|---|---|---|---|---|---|---|---|---|---|---|---|---|---|
| | | | | | Surface | 0.2 | 0.4 | 0.6 | 0.8 | 1.0 | 1.2 | 1.4 | 1.6 | 1.8 | 2.0 | 2.2 | 2.4 | 2.6 | 2.8 | 3.0 mm | |
| 35 | Ar | CO:0.1 (7.7) | Ar | 65 | 403 | 405 | 406 | 403 | 410 | 402 | 405 | 403 | 411 | 360 | 361 | 365 | 464 | 351 | 353 | 361 | 7.0 |
| 36 | Ar | CO:0.5 (29) | Ar | 65 | 474 | 474 | 471 | 463 | 473 | 463 | 476 | 471 | 474 | 464 | 366 | 361 | 377 | 352 | 369 | 364 | 3.1 |
| 37 | Ar | Ar1.01 + CO:0.3 (12) | Ar | 65 | 409 | 416 | 415 | 414 | 416 | 413 | 423 | 422 | 416 | 352 | 352 | 364 | 341 | 373 | 340 | 389 | 6.0 |
| 38 | Ar + 0.2% N$_2$ | CO:0.2 (14) | Ar | 65 | 429 | 431 | 431 | 427 | 429 | 430 | 428 | 429 | 430 | 338 | 372 | 362 | 374 | 373 | 359 | 362 | 2.0 |
| 39 | Ar + 0.2% N$_2$ | CO:0.01 (0.8) | Ar | 65 | 414 | 412 | 415 | 414 | 413 | 415 | 416 | 414 | 416 | 349 | 366 | 374 | 366 | 378 | 370 | 353 | 6.4 |
| 40 | Ar + 0.05% N$_2$ | CO:0.2 (14) | Ar | 65 | 413 | 417 | 413 | 415 | 415 | 414 | 413 | 415 | 414 | 359 | 349 | 326 | 335 | 362 | 349 | 338 | 5.9 |
| 41 | Ar | CO$_2$:0.1 (7.7) | Ar | 65 | 406 | 409 | 410 | 408 | 409 | 408 | 410 | 408 | 409 | 374 | 339 | 361 | 353 | 366 | 372 | 366 | 6.7 |
| 42 | Ar | O$_2$:0.05 (4) | Ar | 65 | 407 | 405 | 406 | 404 | 405 | 403 | 404 | 404 | 405 | 377 | 374 | 362 | 369 | 362 | 370 | 339 | 7.1 |
| 43 | Ar | Methane 0.15 (11.1) | Ar | 65 | 410 | 415 | 414 | 413 | 412 | 409 | 410 | 415 | 414 | 416 | 355 | 366 | 374 | 349 | 372 | 341 | 5.6 |
| 44 | Ar + 0.2% N$_2$ | Methane 0.15 (11.1) | Ar | 65 | 426 | 427 | 425 | 420 | 423 | 426 | 429 | 427 | 425 | 424 | 352 | 326 | 378 | 373 | 370 | 377 | 4.2 |
| 45 | Ar | Ammonia 0.15 (11.1) | Ar | 75 | 405 | 403 | 406 | 404 | 408 | 409 | 407 | 403 | 402 | 405 | 378 | 372 | 361 | 370 | 359 | 352 | 6.3 |
| 46 | Ar | CO:0.2 (14.2) | Ar | 50 | 407 | 409 | 410 | 414 | 411 | 410 | 418 | 407 | 410 | 409 | 412 | 411 | 410 | 330 | 364 | 372 | 6.8 |
| 47 | Ar | CO:0.2 (14.2) | Ar | 65 | 411 | 413 | 415 | 410 | 409 | 353 | 362 | 341 | 362 | 409 | 371 | 370 | 355 | 312 | 376 | 377 | 6.5 |
| 48 | Ar + 0.3% N$_2$ | — | Ar | 65 | 418 | 417 | 421 | 423 | 419 | 416 | 419 | 420 | 422 | 372 | 372 | 370 | 371 | 353 | 372 | 366 | 4.2 |
| 49 | Ar + 0.3% N$_2$ | — | Ar | 65 | 433 | 410 | 411 | 420 | 427 | 414 | 393 | 290 | 287 | 288 | 268 | 280 | 276 | 284 | 274 | 277 | 3.0 |
| 50 | Ar | CO:1.8 (60) | | | | | | | | | | | | | | | | | | | |

Numbers in parentheses indicate percentages by volume.

EXAMPLE 3

Table 3 shows welding conditions used in the melt-hardening method according to the present invention, which is applied to valve retainers for retaining valve springs of automobile engines, and the member hardening characteristics. The portion of each retainer which is to be in contact with the spring was subjected to a melt-hardening process.

A Ti-6Al-4V alloy was used for the valve retainers except for that of Test No. 49. The valve retiner of Test No. 49 was made of essentially pure titanium. For all sample members, the welding speed was kept at a constant speed of 10 mm/sec, and the welding current was varied at three levels, 75, 65, and 50 A. While each valve retainer was rotated relatively to the torch, the torch was oscillated at 180 cycles per second, in the direction perpendicular to the moving direction of the valve retainer. Thus, the molten-metal surface of the molten pool was rippled, thereby facilitating penetration of the hardening gas.

The torch used in Example 3, as in Example 2, is a plasma-arc torch which has the working-gas passage 23 and the third passage 27, as shown in FIG. 4. The working-gas passage 23 was supplied with first working gases of the mixture ratios shown in Table 3, at a flow rate of 1.2 l/min. The shielding-gas passage 25 was supplied with argon gas as the shielding gas, at a flow rate of 20 l/min. The third passage 27 was supplied with second working gases of compositions shown in Table 3.

Also in Example 3, after the individual sample members were melt-hardened by the method of the invention or by the method for comparison, the hardness distribution and the depth of wear after 200 hours of engine running test were measured and compared. A load of 1 kgf was used in the Vickers hardness test.

In Example 3, the working gases were supplied mainly to the third passage 27. First, only argon gas, for use as a working gas, was supplied to the workinggas passage 23, while carbon monoxide, as another working gas, was supplied to the third passage 27 and the flow rate thereof was varied. Even when the amount of the carbon monoxide supply, which was made variable, increased, the hardened layer depth was substantially constant (1.6 to 1.8 mm) so long as the welding current was fixed at a constant value. As the amount of carbon monoxide increased, however, the Hv-number increased correspondingly. In this case, the depth of wear was found to range from 3.1 to 7.0 μm, without departing from its allowable range (Test Nos. 35, 36 and 37). When the amount of carbon monoxide exceeded a suitable range (30% or less), however, the bead surface was deteriorated in shape (Test No. 50).

Meanwhile, when the welding current was changed from 50 A to 75 A, with the amount of carbon monoxide kept constant, the hardened layer depth changed from about 0.9 mm to about 2.4 mm. Thus, the hardened layer depth can be controlled without changing the Hv-number (Test Nos. 46 and 47).

When a first working gas containing a hardening gas (argon plus nitrogen), was supplied to the working-gas passage 23, and when a second gas containing another hardening gas (carbon and methane) different from the first working gas, was supplied to the third passage 27, a substantially uniform Hv-number was able to be obtained throughout the hardened layer. The surface-layer hardness was able to be controlled accurately by adjusting the hardening gas of the first or second working gas to a suitable amount (Test Nos. 38, 39, 40, 48 and 49).

In Test Nos. 41 to 45, moreover, hardening gases (carbon dioxide, oxygen, methane, and ammonia) other than carbon monoxide were supplied to the third passage 27. A uniform hardness distribution was obtained throughout the hardened layer with use of any of these hardening gases. These results indicate that a desired hardness can be obtained in accordance with the types and amounts of mixture of the hardening gases, by adjusting such types and amounts to suitable values.

There will now be described another embodiment of the method for manufacturing a wear-resistant titanium or titanium-alloy member according to the present invention. In this embodiment, a hardening alloy element or elements are applied to the surface of a member made of titanium or a titanium alloy, and the member surface is sprayed with a hardening gas, to be melt-hardened together with the hardening alloy element(s).

Preferably, the hardening alloy element or elements include one or more elements selected from a group including at least aluminum, tin, boron, iron, chromium, nickel, manganese, copper, silicon, silver, tungsten, molybdenum, vanadium, niobium or columbium, tantalum, and zirconium.

Titanium may be mixed, as required, in the hardening alloy element(s) so that the resulting mixture is applied to the member surface. Alternatively, at least one of compounds including carbide, nitride, and oxide, may be mixed in the hardening alloy element(s) so that the resulting mixture is applied to the member surface. Moreover, a nickel-base alloy may be used as a hardening alloy element. TiC or SiC may be used suitably as the carbide; TiN or $Si_3N_4$ as the nitride, and $Al_2O_3$ or $TiO_2$ as the oxide, for example.

The hardening alloy element is in the form of a powder when it is supplied to the surface of the member. If a mixture of two or more hardening alloy elements is applied to the member surface, it may be either pre-mixed powder or pre-alloyed powder obtained by pulverizing an alloy ingot. Preferably, the hardening alloy elements are prepared by pulverizing an alloy ingot or the like into powder of a suitable particle size, e.g., 50 to 400 mesh, by means of a pulverizer, such as a vibrating ball mill.

Various titanium alloys may be used, including Ti-6Al-4V, Ti-6Al-22V, Ti-6Al-4Mo, Ti-8Al-4V-2Sn-0.5Nb, and Ti-4Al-2V-0.2S-0.9REM, for example.

The hardening alloy elements may be applied to the member surface by various methods. They are applied to the regions of the member surface to be hardened prior to the hardening operation, by the conventional plasma spraying, plating, physical or chemical vapor deposition, etc. A plasma arc, plasma jet, or laser beam may be applied to the alloy elements, along with the member surface, for melt-hardening. Alternatively, powder of hardening alloy elements, carried by a powder carrier gas, may be supplied to the to-be-hardened surface regions, by laser or plasma powder padding, so that the alloy elements are melt-hardened, together with the member surface, by laser or plasma.

Suitably applicable to the present invention are plasma arcs, plasma jets, and laser beams which can locally heat the member surface to a high temperature for melting, can fuse the surface deeply, and can permit a high-speed, high-density melt-hardening process. In the melt-hardening process, the member may be moved relatively to the torch by rotation or the like so that desired regions are melt-hardened. Alternatively, the torch may be moved with the member fixed. If the member is movable, melting of the member surface and penetration of the hardening alloy elements may be facilitated by oscillating the torch at right angles to the moving direction of the member, thereby further rippling the surface of the molten pool.

The hardening alloy elements supplied to the member surface by the conventional method, such as plasma spraying, penetrate the member surface to form a hardened surface layer prior to the melt-hardening process. When the alloy elements, in this state, are melted together with the member surface by means of a plasma arc or the like, they penetrate deep into the molten layer, thus forming a thick, highly hardened layer. In performing the process, if titanium is previously mixed with the hardening alloy elements, such as aluminum, the penetration of the alloy elements into the molten layer is facilitated, so that the hardened layer can be formed with more uniform hardness distribution.

Figure 6:
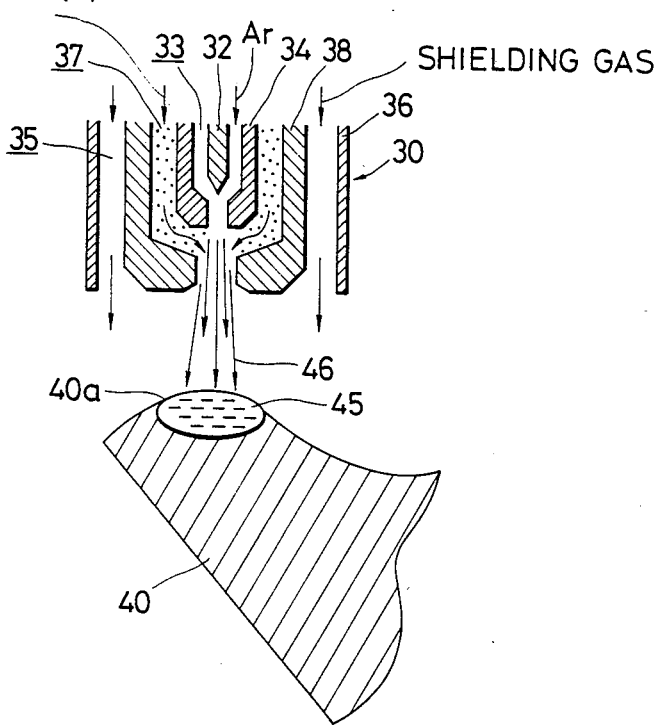
FIG. 6 is a sectional view showing a principal part of a plasma-arc torch which is used to melt-harden the member with hardening alloy elements applied to the member surface, according to the method of the present invention.

FIG. 6 shows schematically how the present invention is effected by the use of a plasma-arc torch 30 which is similar to the torch 10 shown in FIG. 4. The torch 30 has a tungsten electrode 32 in the center. First and second inner torch cylinders 34 and 38 and an outer torch cylinder 36 are arranged successively, in a coaxial manner, around the electrode 32. These cylinders 34, 38 and 36 are spaced at predetermined distances from the electrode 32 and from one another. An annular working-gas passage 33 is defined between the electrode 32 and the first inner cylinder 34. An annular powder passage 37 is defined between the first and second inner cylinders 34 and 38. Also, an annular shielding-gas passage 35 is defined between the second inner cylinder 38 and the outer cylinder 6. The powder passage 37 is bent radially inward at its outlet portion. The alloy element powder, carried from a powder feeder (not shown) by the powder carrier gas, spouts from the powder passage 37, and joins a plasma jet 46 produced in the working-gas passage 33, and the resulting jet spouts from the torch 30. The working-gas passage 33 is supplied with the working gas containing an inert gas, such as argon or helium, which produces the high-temperature, high-speed plasma jet 46. The plasma jet 46 is sprayed on a region (valve face) 40a of a member (engine poppet valve in FIG. 6) 40 to be surface-hardened, so that the member surface 40a, along with the hardening alloy elements, is melt-hardened, thereby forming a hardened layer (referred to as a plasma powder-padding process). On the other hand, an inert gas (shielding gas), such as argon or helium, is fed into the shielding-gas passage 35. The shielding gas serves to shield the plasma jet 46 spouting from the working-gas passage 33, and the surface of the molten pool (weld) 45 from the atmospheric environment.

A hardening gas may be mixed with the working gas supplied to the working-gas passage 33 by means of the torch 30 shown in FIG. 6. In this case, the hardening gas, along with the plasma jet 46, is sprayed on the member surface 40a to melt-harden it together with the hardening alloy elements. Thereupon, the hardening gas penetrates the molten pool 45 through its surface, thus contributing to the formation of the hardened layer, just as in the melt-hardening process shown in FIG. 3. In spraying the hardening gas, it may be supplied to the shielding-gas passage 35 of the torch 30, for example. When using a laser beam, the hardening gas may be mixed in the shielding gas or in an auxiliary gas.

Various hardening gases may be used as the hardening gases, including a mixture of an inert gas, such as argon or helium, and one or more gases selected from a group including nitrogen, carbon monoxide, carbon dioxide, oxygen, methane, ammonia, etc. If the hardening gas or gases are mixed excessively in the working gas, the Hv-number unduly increases, and the surface of the weld bead is deteriorated in shape. In consideration of economical efficiency and easiness of handling, one or more gases selected from a group including nitrogen, carbon monoxide, and carbon dioxide, are used as the hardening gas or gases. If the carbon monoxide is solely used as the hardening gas, its mixture ratio to the working gas (mixture of inert gas and hardening gas) is preferably 30% or less by volume. If the carbon dioxide is solely used, its mixture ratio is preferably 20% or less by volume. If the nitrogen gas is solely used, its mixture ratio is preferably 20% or less by volume. If a mixture of nitrogen gas, and carbon dioxide and/or carbon monoxide is used for the purpose, the total mixture ratio of these hardening gases preferably ranges from 1 to 50% by volume.

The present melt-hardening method may be applied suitably, for example, to surface-hardening of members having sliding-contact regions, such as suction and exhaust valves, rocker arms, retainers, lifter valves, piston pins, etc., of automobile engines. When the types and amounts of the hardening alloy elements added, the mixture ratios of titanium, carbide, etc., the mixture ratio of the hardening gases, the welding speed, and the welding current are adjusted suitably, depending on the applied members, the resulting products suffer less voids, and are improved in cohesion property. Also, the Hv-number and the hardened layer depth can be adjusted to desired values within predetermined ranges, the former ranging from 390 to 1,200, preferably from 400 to 800, and the latter ranging from 0.1 to 2.0 mm, preferably from 0.3 to 1.5 mm.

After the melt-hardening process described above is performed, the member can be heated for heat treatment or forging without changing the hardness characteristics of the melt-hardened region. After the hardening operation, moreover, other regions of the member surface may be hardened by ion-nitriding, gasnitriding, plasma spraying, surface oxidation, plating, etc.

TABLE 4

| Test No. | Sprayed Film Material | Thickness (mm) | Powder | Auxiliary Gas | Laser Output (KW) | Composition of Hardened Region | Hardened Layer Depth[1] (mm) | Hardness of Hardened Region(Hv) | Wear of Valve Face[2] (μm) |
|---|---|---|---|---|---|---|---|---|---|
| 61 | (50Ni—50Al) | 0.2 | — | — | 1.2 | 20Al—14.3Ni—2.8V—1.4Sn—0.3Nb—Ti | 0.5 | 477 | 6 |
| 62 | (50Ni—50Al) | 0.2 | — | CO | 1.2 | 20Al—14.3Ni—2.8V—1.4Sn—0.3Nb—C—O—Ti | 0.5 | 603 | 1 |
| 63 | (Ni—16Cr—6Al—1Y) | 0.1 | — | — | 1.0 | 7.5Al—19Ni—4Cr—0.25Y—3V—1.5Sn—0.4Nb—Ti | 0.2 | 424 | 15 |
| 64 | Mo | 0.5 | 15Al—10V—Ti | — | 1.5 | 7Al—25Mo—4.6V—0.6Sn—0.15Nb—Ti | 1.8 | 448 | 12 |
| 65 | TiO$_2$ + Al[3] | 0.2 | — | CO | 1.2 | 5.8Al—2.9v—1.4Sn—0.3Nb—C—O—26TiO$_2$—Ti | 0.5 | 442 | 1 |
| 66 | TiB$_2$ + Al[4] | 0.2 | — | CO | 1.2 | 5.8Al—2.9V—1.4Sn—0.3Nb—C—O—26TiB$_2$—Ti | 0.5 | 426 | 1 |
| 67 | 40Si$_3$N$_4$ + 60Al | 0.2 | — | Ar | Current 80A | 29Al—2.4v—1.2Sn—0.3Nb—16.5Si$_3$N$_4$—Ti | 0.3 | 601 | 0 |
| 71 | (50Ni—50Al) | 0.2 | — | — | — | — | — | — | Separation of sprayed portion |
| 72 | (Ni—16Cr—6Al—1Y) | 0.1 | — | — | — | — | — | — | Separation of sprayed portion |
| 73 | Mo | 0.5 | — | — | — | — | — | — | Separation of sprayed portion |
| 74 | TiO$_2$ + Al[3] | 0.2 | — | — | — | — | — | — | Separation of sprayed portion |
| 75 | TiB$_2$ + Al[4] | 0.2 | — | — | — | — | — | — | Separation of sprayed portion |
| 76 | 50Si$_3$N$_4$ + 50Al | 0.2 | — | — | — | — | — | — | Separation of sprayed portion |

[1] Depth measured after 0.2 mm Machining
[2] After 100 hours of endurance running test
[3] 92% TiO$_2$ 8% Al by weight
[4] 92% TiB$_2$ 8% Al by weight

EXAMPLE 4

Table 4 shows welding conditions used in the melt-hardening method according to the present invention, which is applied to automobile engine valves, and the member hardening characteristics. After various sprayed film materials shown in Table 4, for use as hardening alloy elements, were sprayed on the valve face of each engine valve by a conventional method, a laser beam was applied to to-be-hardened regions of the valve face, for melt-hardening (referred to as a laser-melting process).

A Ti-8Al-4V-2Sn-0.5Nb alloy was used in common for all sample members or engine valves, whose head diameter was 30 mm. The sprayed film materials were sprayed on the to-be-hardened regions of the individual sample members, thereby forming sprayed film layers of thicknesses shown in Table 4. Thereafter, the sample members were subjected to a laser-melting process under such conditions as a laser output of 1.0 to 1.5 kW, a flow rate of 10 l/min for shielding gas (helium), a welding speed of 17 mm/sec, and a flow rate of 10 l/min for auxiliary gas. The sample members, hardened in this manner, were measured and compared for several hardening characteristics, including the composition of hardened regions, hardened layer depth (mm), Hv-number, and depth of wear ($\mu$m). The above hardened layer depth is a depth obtained after an allowance of 0.2 mm for surface finishing has been removed after the melt-hardening process. The depth of wear is that of the valve face of each valve, as a sample member, measured after 100 hours of endurance running test under fixed conditions, with each sample member mounted on an actual engine. For comparison purpose, moreover, sample members were subjected only to conventional plasma spraying, under the same conditions as those for the present invention, and were measured for the aforesaid hardening characteristics. The measured characteristics of the sample members used in the method for comparison were compared with those of the members used in the method of the invention.

As clearly seen from Table 4, the sample members (Test Nos. 71 to 76) tested according to the method for comparison, although the same sprayed film materials were used as used for the sample members (Test No. 61 to 67) according to the invention, were not able to stand 100 hours of endurance running test, suffering separation of the hardened layer (sprayed region) formed by plasma spraying. On the other hand, all the sample members processed according to the invention, which were subjected to laser-melting after spraying, was found to have a hardened layer depth and a hardness within the ranges provided by the invention. Also, the depth of wear of the valve face, after 100 hours of endurance running test, was found to range from 0 to 15 $\mu$m. In consideration of the obtained thickness of the hardened layer, the valves can be regarded as satisfactory in life performance.

If the hardening alloy elements used are obtained by pulverizing an alloy ingot, they are parenthesized for discrimination purpose in Tables 4 to 10. After pre-alloyed powder prepared by pulverizing a 50Ni-50Al alloy ingot, containing 50% nickel and 50% aluminum by weight, was plasma-sprayed to a thickness of 0.2 mm on the surface of a sample member, the sample member was subjected to laser-melting process with an auxiliary gas (carbon monoxide), for use as a hardening gas, being supplied to the region to be hardened (Test No. 62). The resulting hardened region was harder and showed less wear than that of a sample member (Test No. 61) subjected to laser-melting process without the supply of any auxiliary gas. Thus, a hardened layer of higher hardness can be obtained by melt-hardening the member while supplying the hardening gas as required.

Besides aluminum and nickel, various other hardening alloy elements may be mixed with satisfactory results. In Test No. 61, Ni-16Cr-6Al-1Y pre-alloyed powder was plasma-sprayed and melt-hardened to have a hardened layer depth and an Hv-number within the predetermined ranges of the present invention. In Test Nos. 65, 66 and 67, powder mixtures of 92% $TiO_2$ and 8% aluminum, 92% $TiB_2$ and 8% aluminum, and 40% $Si_3N_4$ and 60% aluminum, by weight, were plasma-sprayed and melt-hardened with similar results. In Test No. 67, the plasma powder-padding process was performed by using the torch 30 shown in FIG. 6, without conducting laser-melting. In doing this, argon was used as the working gas, and a plasma arc was generated with a welding current of 80 A. In Test No. 64, after molybdenum powder was plasma-sprayed, the to-be-hardened region was melt-hardened by means of a laser beam, while being supplied with 15Al-10V-Ti alloy powder (particle size: 80 to 250 mesh), with use of argon as the powder carrier gas (referred to as a laser powder-padding process). In this case, a hardened layer depth of 1.8 mm and an Hv-number of 448 were obtained.

TABLE 5

| Test No. | Powder | Composition of Working Gas (% by volume) | Dilution Rate (%) | Current (A) | Composition of Hardened Region | Hardened Layer Depth[1] (mm) | Hardness of Hardened Region (Hv) | Depth of Wear of Sliding Contact Surface ($\mu$m)[2] |
|---|---|---|---|---|---|---|---|---|
| 80 | (3Al—4V—Ti) | Ar + 20$N_2$ | 10 | 65 | 3Al—3.8V—N—Ti | 0.3 | 503 | 8 |
| 81 | (6Al—4V—Ti) | Ar + 0.1$N_2$ | 10 | 65 | 5.7Al—3.8V—N—Ti | 0.3 | 410 | 21 |
| 82 | (6Al—4V—Ti) | Ar + 1.0$N_2$ | 10 | 65 | 5.7Al—3.8V—N—Ti | 0.3 | 506 | 9 |
| 83 | (15Al—6V—Ti) | Ar | 10 | 65 | 14Al—5.5V—Ti | 0.3 | 451 | 15 |
| 84 | (15Al—6V—Ti) | Ar + 0.03$N_2$ | 10 | 65 | 14Al—5.5V—N—Ti | 0.3 | 802 | 3 |
| 85 | (15Al—6V—Ti) | Ar + 1.0$N_2$ | 10 | 65 | 14Al—5.5V—N—Ti | 0.3 | 1104 | 0 |
| 86 | (6Al—4V—Ti) | Ar + 1.0$N_2$ | 30 | 80 | 5Al—3.5V—N—Ti | 1.0 | 489 | 10 |
| 87 | (6Al—4V—Ti) | Ar + 1.0$N_2$ | 10 | 60 | 5.7Al—3.8V—N—Ti | 0.1 | 497 | 0 |
| 88 | (3Al—2V—Ti) | Ar | 10 | 65 | 3Al—2V—Ti | 0.3 | 351 | 254 |
| 89 | (6Al—4V—Ti) | Ar | 10 | 65 | 5.7Al—3.8V—Ti | 0.3 | 375 | 235 |

[1] Depth measured after 0.2 mm machining
[2] After 200 hours of endurance running test

EXAMPLE 5

Table 5 shows welding conditions used in the melt-hardening method according to the present invention, which is applied to rocker arms of automobile engines, and the member hardening characteristics. The portion of each rocker arm which is to be in sliding contact with a valve tip was subjected to the plasma powder-padding process, using various hardening alloy elements shown in Table 5, and was then melt-hardened.

A Ti-3Al-2V alloy was used in common for all sample members. The powder passage 37 of the torch 30 shown in FIG. 6 was supplied with powder of hardening alloy elements of compositions shown in Table 5, pulverized to a particle size of 100 to 300 mesh, with use of argon gas as the powder carrier gas flowing at a rate of 1.0 to 1.5 l/min. The working-gas passage 33 was supplied with working gases of compositions shown in Table 5 at a constant flow rate of 0.7 l/min. The shielding-gas passage 35 was supplied with argon gas at a fixed flow rate of 15 l/min. The welding speed, welding current, and oscillation frequency were adjusted to 2.0 mm/sec, 60 to 80 A, and 280 cycles/min, respectively. After the individual sample members were melt-hardened by the method of the invention or by the method for comparison, their hardening characteristics were measured in the same manner as in Example 4. The measurement results are tabulated in Table 5.

All the hardening alloy elements used in Example 5 was prepared by pulverizing an alloy ingot containing titanium, aluminum, and vanadium. In all the tests except for Test No. 86, the dilution rate (the ratio of the cross-sectional area of a melted base-metal portion to the total cross-sectional area of a build-up portion plus the base-metal portion) was fixed at a constant value of 10%.

Powder of hardening alloy elements (Ti-3Al-2V) having the same composition as the base metal of the rocker arm was deposited on the to-be-hardened region by plasma powder padding (Test No. 88). Thereupon, a hardened region with a hardened layer depth of 0.3 mm and an Hv-number of 351 was formed having the same composition as the base metal. Also, powder of hardening alloy elements (Ti-6Al-4V) of higher aluminum and vanadium contents than the base metal was deposited by plasma powder padding (Test No. 89). In this case, the Hv-number increased since the aluminum and vanadium contents of the hardened region were increased. In either case, however, the range of hardness provided by the present invention was not attained, and the sliding contact surface of the rocker arm suffered a substantial wear after 200 hours of endurance running test.

Meanwhile, sample members (Test Nos. 81 and 82) was prepared using the same powder of hardening alloy elements (Ti-6Al-4V), with nitrogen gas being mixed in the hardening gas to be supplied to the working-gas passage 33 of the torch 30. Other process conditions were the same as those used in Test No. 89 according to the method for comparison. In Test Nos. 81 and 82, Hv-numbers of 410 and 506 were obtained for the hardened region, with use of nitrogen contents of 0.1% and 1.0% by volume, respectively. In either case, the hardness of the hardened region was found to be within the predetermined range according to the invention. When the hardening-gas content was increased, an Hv-number of 503 was obtained even with use of powder of hardening alloy elements (Ti-3Al-4V) of a lower aluminum content (Test No. 80). When powder of hardening alloy elements (Ti-15Al-6V) of a higher aluminum content was used, an Hv-number of 451, which is within the predetermined range, was able to be obtained without mixing hardening nitrogen gas in the working gas (Test No. 83). When the hardening nitrogen gas was mixed at rates of 0.03% and 1.0%, the Hv-number increased to very high levels of 802 and 1,104, respectively.

When the welding current was lowered from 65 A to 60 A with the nitrogen content of the working gas kept constant, the Hv-number of the hardened region hardly changed, but the hardened layer depth was reduced (Test Nos. 82 and 87). On the other hand, when the welding current was increased to make the dilution rate greater, that is, when the ratio of the melted base-metal portion was increased, the hardened layer depth increased from 0.3 mm to 1.0 mm (Test Nos. 82 and 86). These results indicate that the hardness of the hardened region can be increased by increasing either the amount of the hardening alloy elements or the hardening-gas content in the working gas, and that the hardened layer depth can be made larger by only increasing the welding current, thereby thickening the melted base-metal layer.

TABLE 6

| Test No. | Powder | Auxiliary Gas | Dilution Rate (%) | Laser Output (Kw) | Composition of Hardened Region | Hardened Layer Depth[1] (mm) | Hardness of Hardened Region (Hv) | Depth of Wear of Sliding Contact Surface[2] (μm) |
|---|---|---|---|---|---|---|---|---|
| 90 | (4Al—2V—Ti) | CO | 30 | 1.2 | 4Al—2V—0.06S—0.27REM—C—O—Ti | 0.5 | 395 | 25 |
| 91 | (6Al—4V—Ti) | CO | 10 | 1.0 | 5.8Al—3.8V—0.1REM—C—O—Ti | 0.2 | 414 | 18 |
| 92 | (6Al—4V—Ti) | CO | 30 | 1.2 | 5.4Al—3.4V—0.06S—0.27REM—C—O—Ti | 0.5 | 415 | 17 |
| 93 | (11Cr—13V—4Al—Ti) | CO | 30 | 1.2 | 7.7Cr—4Al—9.7V—0.06S—0.27REM—C—O—Ti | 0.5 | 486 | 9 |
| 94 | (11Cr—13V—4Al—Ti) | Ammonia | 30 | 1.2 | 7.7Cr—4Al—9.7V—0.06S—0.27REM—C—O—Ti | 0.5 | 519 | 7 |
| 95 | (11Cr—13V—4Al—Ti) | CO | 50 | 1.5 | 5.5Cr—4Al—7.5V—0.1S—0.45REM—C—O—Ti | 1.7 | 482 | 8 |
| 96 | (6Al—4V—Ti) + 10TiN | CO | 30 | 1.2 | 5Al—3.1V—0.06S—0.27REM—C—O—Ti—7TiN | 0.5 | 432 | 1 |
| 98 | (11Cr—13V—4Al—Ti) | CO | 10 | 0.9 | 10Cr—12V—4Al—0.1REM—C—O—Ti | 0.04 | 535 | Cracking of hardened Surface |
| 99 | (4Al—2V—Ti) | Ar | 30 | 1.2 | 4Al—2V—0.06S—0.27REM—C—O—Ti | 0.5 | 375 | 246 |

[1] Depth measured after 0.2 mm machining
[2] After 1,000 hours of endurance running test

EXAMPLE 6

Table 6 shows welding conditions used in the melt-hardening method according to the present invention, which is applied to rocker arms of automobile engines, just as in Example 5, and the member hardening characteristics. A sliding-contact surface of each rocker arm was subjected to the aforementioned laser powder-padding process, using various hardening alloy elements shown in Table 6, and was then melt-hardened.

In Example 6, a Ti-4Al-2V-0.2S-0.9REM alloy was used for sample members. While the to-be-hardened region was supplied with powder of hardening alloy elements of compositions shown in Table 6, pulverized to a particle size of 80 to 250 mesh, with use of helium gas as the powder carrier gas, a laser beam was irradiated with oscillation motion to conduct for laser powder padding operation, with a laser output of 0.9 to 1.5 kW and a welding speed of 5 mm/sec. Helium gas was supplied as a shielding gas at a flow rate of 8 l/min, and an auxiliary gas was supplied at a constant flow rate of 10 l/min.

Powder of hardening alloy elements (Ti-4Al-2V) similar in composition to the base metal was deposited on the to-be-hardened region by laser powder padding process using argon gas, without the use of any hardening gas in the auxiliary gas. Thereupon, the Hv-number of the resulting hardened region was 375, which is lower than the lower limit of the predetermined range of the invention, and the depth of wear of the sliding-contact surface, after 200 hours of endurance running test, was as large as 246 μm (Test Nos. 99). When carbon monoxide was used as the auxiliary gas, however, the Hv-number increased to 395, which is within the predetermined range (Test No. 90). When powder of hardening alloy elements (Ti-6Al-4V) of an increased aluminum content was used, the Hv-number increased to 415 (Test No. 92). When powder of hardening alloy elements (Ti-11Cr-13V-4Al) of high chromium and vanadium contents and an unchanged aluminum content was used, the Hv-number further increased (Test No. 93).

When the laser output was reduced from 1.2 kW to 1.0 kW to obtain a dilution rate of 10%, with use of carbon monoxide as the auxiliary gas, the hardened layer depth was reduced from 0.5 mm to 0.2 mm, although the Hv-number hardly changed (see Test Nos. 91 and 92). When the laser output was increased from 1.2 kW to 1.5 kW to obtain a dilution rate of 50%, on the other hand, the hardened layer depth increased from 0.5 mm to 1.7 mm (see Test Nos. 93 and 95).

When ammonia was used in place of carbon monoxide, as the hardening gas, the Hv-number further increased (Test No. 94). When a nitride (TiN) was in with the hardening alloy elements (Ti-6Al-4V), the Hv-number also increased (see Test Nos. 92 and 96).

EXAMPLE 7

Table 7 shows welding conditions used in the melt-hardening method according to the present invention, which is applied to valves of automobile engines, and the member hardening characteristics. The valve face of each engine valve was subjected to the plasma powder-padding process, using various hardening alloy elements shown in Table 7, and was then melt-hardened.

TABLE 7

| Test No. | Powder | Dilution Rate (%) | Current (A) | Composition of Hardened Region | Hardened Layer Depth (mm)[1] | Hardness of Hardened Region (Hv)[2] | Depth of Wear of Valve face (μm)[3] | Remarks |
|---|---|---|---|---|---|---|---|---|
| 100 | 10Al + 4V + Ti | 10 | 65 | 9.6Al—4V—Ti | 0.3 | 404 | 28 | |
| 101 | 20Al + 4V + Ti | 10 | 65 | 18.6Al—4V—Ti | 0.12 | 505 | 5 | Welding Speed 10.5 mm/sec |
| 103 | 20Al + 4V + Ti | 10 | 65 | 18.6Al—4V—Ti | 0.3 | 504 | 4 | |
| 104 | 50Al + Ti | 10 | 65 | 45.6Al—4V—Ti | 0.3 | 710 | 2 | |
| 105 | 50Al + 4V + Ti | 10 | 65 | 45.6Al—0.4V—Ti | 0.3 | 712 | 2 | |
| 106 | 20Al + 4V + Ti | 30 | 75 | 15.8Al—4V—Ti | 1.2 | 458 | 10 | |
| 107 | 20Al + 4Mo + Ti | 10 | 65 | 15.8Al—3.6Mo—0.4V—Ti | 0.3 | 454 | 11 | |
| 108 | (20Al—4Mo—Ti) | 10 | 65 | 15.8Al—3.6Mo—0.4V—Ti | 0.3 | 454 | 11 | Ti alloy powder |
| 109 | (20Al—4Mo—Ti) + 4V | 30 | 90 | 15.8Al—3.6Mo—Ti | 2.0 | 507 | 5 | Excessive buildup |
| 110 | 20Al + 25Nb + Ti | 60 | 80 | 11.5Al—10Nb—2.4V—Ti | 1.5 | 529 | 4 | |
| 111 | 30(NiAl) + Ti | 20 | 70 | 13Al—12Ni—0.6V—Ti | 0.8 | 489 | 7 | 50Ni—50Al alloy |
| 112 | 40(Kolmonoy-4) + 6Al + Ti | 20 | 70 | 6Al—0.7V—0.1C—1.0Si—3Cr—0.6B—1Fe—26Ni—Ti | 0.8 | 455 | 11 | Self-brazing Ni alloy |
| 113 | (6Al—2.5Sn—5Zr—2.5Mo—Ti) + 3V | 20 | 70 | 6Al—2Sn—4Zr—2Mo—3.2V—Ti | 0.8 | 421 | 13 | Ti alloy powder |
| 114 | (6Al—4V—11W—Ti) | 10 | 65 | 6Al—4V—10W—Ti | 0.3 | 500 | 5 | Ti alloy powder |
| 115 | 6Al + 4V + 1W + 25Nb + Ti | 10 | 65 | 6Al—4V—0.9W—22Nb—Ti | 0.3 | 422 | 14 | |
| 116 | (20Al—Ti) + 10TiC | 20 | 70 | 17Al—0.8V—8TiC—Ti | 0.8 | 410 | 20 | |
| 120 | 10Al + Ti | 10 | 65 | 9.6Al—0.4V—Ti | 0.3 | 383 | 306 | |
| 121 | 20Al + 4V + Ti | 10 | 60 | 18.6Al—4V—Ti | 0.05 | 504 | Cracking of hardened region | Welding Speed 10.5 mm/sec |
| 122 | 80Al + Ti | 10 | 65 | 72Al—0.4V—Ti | 0.3 | Weld-cracking | — | |
| 123 | (6Al + 4V + 1W + Ti) | 10 | 65 | 6Al—4V—0.9W—Ti | 0.3 | 385 | 250 | |

[1] Depth measured after 0.2 mm machining
[2] Average measurements at 5 points
[3] After 100 hours of endurance running test In Example 7, a Ti-6Al-4V alloy was used for all sample members or engine valves, whose head diameter was 31 mm. The powder passage 37 of the torch 30 shown in FIG. 6 was supplied with powder of hardening alloy elements of compositions shown in Table 7, pulverized to a particle size of 100 to 250 mesh, with use of argon gas as the powder carrier gas flowing at a rate of 1.5 l/min. The working- and shielding-gas passages 33 and 35 were supplied with argon gas, as a working gas and a shielding gas, respectively, at constant flow rates of 0.8 l/min and 15 l/min, respectively. The welding speed and the welding current were adjusted to 9.5 mm/sec (partially 10.5 mm/sec) and 60 to 90 A, respectively. A water-cooled copper backing was fixed tightly to the valve head of each sample member, and the aforesaid welding current was supplied between the torch and the copper backing. After the individual sample members were melt-hardened by the method of the invention or by the method for comparison, their hardening characteristics were measured. The measurement results are shown in Table 7.

All the hardening alloy elements used in Example 7 contains titanium in the form of either premixed or pre-alloyed powder. When a small amount of aluminum was added, as a hardening alloy element, to the titanium powder (Test No. 120; Ti+10Al), the Hv-number obtained was less than 390 and smaller than the lower limit of the predetermined range of the invention. When a small amount of vanadium was added to the powder, however, the Hv-number increased to 404, and the depth of wear of the valve face, after 100 hours of endurance running test, was reduced from 306 μm to 28 μm (see Test Nos. 100 and 120). As the aluminum content increased, the Hv-number also increased (see Test Nos. 100, 103 and 105).

When the welding speed was increased from 9.5 mm/sec to 10.5 mm/sec, melting of the member was reduced, and the hardened layer depth decreased, although the Hv-number showed no substantial change When the welding current was reduced at the same time, the hardened layer depth decreased so greatly that the surface of the hardened region cracked after 100 hours of endurance running test (Test No. 121). In contrast with the above, when the welding current was increased, both the dilution rate and the hardened layer depth increased, although the Hv-number was reduced (see Test Nos. 103 and 106).

Even when vanadium was not mixed, an increased aluminum content ensured an Hv-number within the predetermined range (Test No. 104). When an excessive amount of aluminum was mixed, however, a undesired weld-cracking was caused (Test No. 122).

An Hv-number within the predetermined range was able to be obtained also by using powder of hardening alloy elements (Ti-20Al-4Mo) including molybdenum in place of vanadium (Test Nos. 103 and 107). The same hardening characteristics was obtained without regard to the way the hardening alloy elements were prepared. The pre-mixed powder was used in Test No. 107, and the pre-alloyed powder was used in Test No. 108, on the other hand. When the welding current was increased to 90 A, while using hardening alloy elements ((Ti-20Al-4Mo)+4V) including molybdenum as well as vanadium, the dilution rate was increased, and the hardened layer depth was able to be increased up to 2.0 mm (Test No. 109). An Hv-number of 529 was obtained with use of hardening alloy elements (Ti+20Al+25 Nb) including niobium or columbium in addition to aluminum. By adjusting the welding current to 80 A, the dilution rate was increased, and a hardened layer depth of 1.5 mm was obtained (Test No. 110).

Besides, mixtures of aluminum and various other hardening alloy elements were able to be used suitably. These additional mixtures include, for example, a combination of aluminum and nickel in the form of 50Ni-50Al alloy powder, a combination of aluminum and a self-brazing alloy named Kolmonoy-4 (trademark; (Ni-0.3C-3.5Si-10Cr-2B-3Fe)), a mixture of 3% vanadium and Ti-6Al-2.5Sn-5Zr-2.5Mo alloy powder, and a mixture of a carbide (10% TiC) and Ti-20Al alloy powder (see Test Nos. 111, 112, 113 and 116). With use of these mixtures, the hardened layer depth and the Hv-number were found to be within their respective ranges provided by the present invention. A combination of the base-metal element and hardening alloy elements including tungsten proved also effective (see Test No. 114). However, powder of hardening alloy elements (Ti+6Al+4V+1W+25Nb) including a small amount of tungsten failed to provide an Hv-number within the predetermined range of the invention (see Test No. 123). When powder of hardening alloy elements (Ti+6Al+4V+1W+25Nb) including niobium or columbium in addition to tungsten was used, an Hv-number within the predetermined range was able to be obtained (Test No. 115).

In Example 7, all the sample members (Test Nos. 100 to 116) treated according to the method of the present invention was found to have a hardened layer depth and an Hv-number within the predetermined ranges of the invention. Also, the depth of wear, after 100 hours of endurance running test, was sufficiently small, thus ensuring a satisfactory life performance of each sample member, considering the hardened layer depth obtained by the treatment.

EXAMPLE 8

Table 8 shows welding conditions used in the melt-hardening method according to the present invention, which is applied to valve lifters interposed between a push rod and a cam shaft of automobile engines, and the member hardening characteristics. A crown-faced portion of each valve lifter, which is to be in sliding contact with the cam shaft, was plated with a 0.15 mm thick film of various hardening alloy elements shown in Table 8, by a conventional method, and was then melt-hardened by the laser-melting process.

In Example 8, a Ti-6Al-22V alloy was used for sample members. The to-be-hardened regions of the individual sample members were plated with films of hardening alloy elements, having a thickness and compositions shown in Table 8. Thereafter, the sample members were subjected to the laser-melting process, using an oscillating laser beam, under such conditions as a laser output of 1.0 kW or 1.5 kW, a flow rate of 20 l/min for shielding gas (argon), a welding speed of 3 mm/sec, and a flow rate of 10 l/min for auxiliary gas (argon or Ar+5N$_2$). The aforesaid several hardening characteristics of the sample members, hardened in this manner, were measured. The measurement results are shown in Table 8.

TABLE 8

| Test No. | Composition of Plating | Thickness (mm) | Powder | Auxiliary Gas | Laser Output (KW) | Composition of Hardened Region | Hardened Layer Depth[1] (mm) | Hardness of Hardened Region (Hv) | Wear of Crown-Faced Portion[2] (μm) |
|---|---|---|---|---|---|---|---|---|---|
| 130 | Ni | 0.15 | — | Ar | 1.0 | 4Al—15V—30Ni—Ti | 0.3 | 602 | 10 |
| 131 | Ni | 0.15 | — | Ar + 5N$_2$ | 1.0 | 4Al—15V—30Ni—N—Ti | 0.3 | 906 | 3 |
| 132 | 60Ni + 40SiC | 0.15 | — | Ar | 1.0 | 4Al—15V—18Ni—12SiC—Ti | 0.3 | 508 | 11 |
| 133 | 70Ni + | 0.15 | — | Ar | 1.0 | 4Al—15V—21N—9TiN—Ti | 0.3 | 511 | 12 |

TABLE 8-continued

| Test No. | Composition of Plating | Thickness (mm) | Powder | Auxiliary Gas | Laser Output (KW) | Composition of Hardened Region | Hardened Layer Depth[1] (mm) | Hardness of Hardened Region (Hv) | Wear of Crown-Faced Portion[2] (μm) |
|---|---|---|---|---|---|---|---|---|---|
| 134 | Ni 30TiN | 0.15 | 6Al—3Mo—8V—Ti | Ar | 1.0 | 4Al—10V—30Ni—1.2Mo—Ti | 0.3 | 794 | 6 |
| 135 | Ni | 0.15 | 6Al—3Mo—8V—Ti | Ar + 5N$_2$ | 1.5 | 5.3Al—13V—12Ni—1.4Mo—N—Ti | 1.0 | 1155 | 0 |
| 136 | 60Ni + 40SiC | 0.15 | — | — | — | — | — | 302 | Flaking of Plating |
| 137 | 70Ni + 30TiN | 0.15 | — | — | — | — | — | 302 | Flaking of Plating |
| 138 | Ni | 0.15 | — | — | — | — | — | 302 | 937 |

[1]Depth measured after 0.2 mm machining
[2]After 700 hours of endurance running test

TABLE 9

| Test No. | Composition of Plating | Thickness (mm) | Powder | Plasma Gas | Current (A) | Composition of Hardened Region | Hardened Layer Depth[1] (mm) | Hardness of Hardened Region (Hv) | Wear of Sliding-Contact Portion[2] |
|---|---|---|---|---|---|---|---|---|---|
| 140 | Cu | 0.05 | — | Ar | 55 | 5.6Al—3.7V—7.7Cu—Ti | 0.5 | 491 | 12 |
| 141 | Cu | 0.12 | — | Ar | 75 | 6.5Al—3.7V—7.7Cu—Ti | 1.3 | 486 | 10 |
| 142 | Cu | 0.05 | 10Al + 10Mn | Ar + 1.0N$_2$ | 55 | 8Al—2V—5Mn—8Cu—N—Ti | 0.5 | 897 | 3 |
| 143 | Al | 0.2 | — | Ar | 55 | 33.3Al—2.8V—Ti | 0.5 | 675 | 7 |
| 146 | Cu | 0.05 | — | — | — | — | — | — | 701 |
| 147 | Al | 0.2 | — | — | — | — | — | — | 2340 |

[1]Depth measured after 0.2 mm machining
[2]After 700 hours of endurance running test When the crown-faced portion of the valve lifter was only plated by the conventional method, the Hv-number obtained was low, and flaking of plating was observed after 700 hours of endurance running test (Test Nos. 136 and 137). Otherwise, the depth of wear was too great for practical use (Test No. 138).

When nickel plating was conducted prior to the laser-melting process, a sufficiently high Hv-number was obtained (Test No. 130). A higher Hv-number was able to be obtained by mixing a hardening gas in the auxiliary gas (Test No. 131). Moreover, an Hv-number within the predetermined range of the invention was also obtained by the laser powder-padding process as described in Example 6, using Ti-6Al-3Mo-8V alloy powder, instead of the laser-melting process (Test No. 134). When nitrogen gas was added to the auxiliary gas and the laser output was raised from 1.0 kW to 1.5 kW, the Hv-number was considerably increased, and the hardened layer depth increased from 0.3 mm to 1.0 mm (Test No. 135). In these processes of laser powder padding, the powder of the hardening alloy elements used had a particle size of 80 to 300 mesh.

Also, when a carbide (SiC; Test No. 132) or a nitride (TiN; Test No. 133) was added to the plating composition in addition to nickel, as a hardening alloy element, a hardened layer depth and a hardness within their predetermined ranges according to the invention were able to be obtained.

EXAMPLE 9

Table 9 shows welding conditions used in the melt-hardening method according to the present invention, which is applied to valve retainers used in a valve operating mechanism for retaining a valve spring of automobile engines, and the member hardening characteristics. The portion of each retainer which is to be in contact with the spring was plated with films of various hardening alloy elements shown in Table 9, having various thicknesses, by a conventional method, and was then melt-hardened by the plasma-melting process.

In this plasma-melting process, a plasma arc is applied to the to-be-hardened region by the plasma arc torch, in order to melt and solidify the hardening alloy elements together with the member surface, thereby forming a hardened layer.

In Example 9, a Ti-6Al-4V alloy was used for sample members. The to-be-hardened regions of the individual sample members were plated with films of hardening alloy elements, having various thicknesses and compositions shown in Table 9. Thereafter, the working-gas passage 33 of the torch 30 shown in FIG. 6 was supplied with a working gas at a constant flow rate of 0.9 l/min, while the shielding-gas passage 35 was supplied with argon gas at a fixed flow rate of 15 l/min. The plasma-melting process was conducted with a welding speed of 2 mm/sec and a welding current of 55 A or 75 A, while oscillating the torch. The aforesaid several hardening characteristics of the sample members, hardened in this manner, were measured. The measurement results are shown in Table 9.

When the sliding-contact portions of the valve retainers were only plated with copper (Test No. 146) or aluminum (Test No. 147) by the conventional method, the member surface, as a matter of course, was not able to be hardened. After 700 hours of endurance running tests, moreover, the depths of wear of the sliding contact portions were as great as 701 or 2,340 μm, which are not a practical figures.

When the plasma-welding process was conducted with a welding current of 55 A, after the plating with copper or aluminum, the hardened layer depth and the Hv-number were found to be within their respective predetermined ranges provided by the present invention. The depth of wear after 700 hours of endurance running test, moreover, proved sufficiently small (Test Nos. 140 and 143). When the thickness of the copper plating and the welding current were increased from 0.05 mm to 0.12 mm and from 55 A to 75 A, respectively, the hardened layer depth increased from 0.5 mm to 1.3 mm, although the Hv-number showed no substantial change (see Test Nos. 140 and 141). Moreover, the powder passage 37 of the torch 30 was supplied with powder of hardening alloy elements (10Al+10Mn), having a particle size of 80 to 250 mesh after the plating with copper, with use of argon gas as the powder carrier gas. Also, nitrogen gas was mixed in the working gas supplied to the working-gas passage 33. In this state, when the plasma powder-padding process was conducted with a welding current of 55 A, the Hv-number increased considerably, although the hardened layer depth showed no change (see FIGS. 140 and 142). If copper is added as a hardening alloy element, the Hv-number can be increased effectively either by mixing a hardening gas in the working gas or by padding with aluminum powder or the like. Also, the gardened layer depth can be increased effectively by raising the welding current.

resulting hardened region measured 370, which is smaller than the lower limit of the predetermined range of the invention, and the depth of wear of the tip end face, after 200 hours of endurance running test, was as large as 320 μm (Test Nos. 161). When hardening alloy elements ((Ti-6Al-4Mo)+6Cu; (Ti-6Al-4Mo)+13Cu) of higher copper contents were used instead, the Hv-number increased to 395 (Test No. 150) or 507 (Test No. 151), which are within the predetermined range of the invention. When powder of hardening alloy elements ((Ti-6Al-4Mo)+22.5Cu) of excessively high copper content was used, undesirable weld-cracking was caused (Test No. 162). When the laser output was increased from 1.2 kW to 1.5 kW, however, the dilution rate was increased. Even though the copper content was high, therefore, the hardened layer depth increased to prevent weld-cracking, and the Hv-number was found to be within the predetermined range of the invention (Test No. 152).

When powder of hardening alloy elements ((Ti-6Al-4Mo)+11Ta+3Al), including tantalum and aluminum

TABLE 10

| Test No. | Powder | Dilution Rate (%) | Laser Output (KW) | Composition of Hardened Region | Hardened Layer Depth[1] (mm) | Hardness of Hardened Region (Hv) | Wear of Tip Surface (μm)[2] | Remarks |
|---|---|---|---|---|---|---|---|---|
| 150 | 6Cu + (6Al—4Mo—Ti) | 30 | 1.2 | 6Al—4Mo—4.2Cu—Ti | 1.0 | 395 | 48 | |
| 151 | 13Cu + (6Al—4Mo—Ti) | 30 | 1.2 | 6Al—4Mo—9Cu—Ti | 1.0 | 507 | 5 | |
| 152 | 22.5Cu + (6Al—4Mo—Ti) | 60 | 1.5 | 6Al—4Mo—9Cu—Ti | 1.8 | 504 | 6 | |
| 153 | 11Ta + 3Al + (6Al—4Mo—Ti) | 10 | 1.1 | 8.5Al—4Mo—10Ta—Ti | 0.6 | 520 | 5 | |
| 154 | 28Ta + 3Al + (6Al—4Mo—Ti) | 10 | 1.1 | 8.5Al—4Mo—25Ta—Ti | 0.6 | 703 | 2 | |
| 155 | 5.5Co + 16Al + Ti | 10 | 1.1 | 15Al—0.4Mo—5Co—Ti | 0.6 | 420 | 20 | |
| 156 | 20Co + 16Al + Ti | 10 | 1.1 | 15Al—0.4Mo—18Co—Ti | 0.6 | 600 | 3 | |
| 157 | (31V—7.2Al—4Mo—0.5Ag—Ti) | 10 | 1.0 | 7Al—4Mo—28V—0.4Ag—Ti | 0.5 | 733 | 1 | |
| 158 | (11Al—22Mo—Ti) | 10 | 0.95 | 10Al—20Mo—Ti | 0.3 | 490 | 9 | |
| 159 | (12Al—6Mo—Ti) + 20TiN | 10 | 0.95 | 11Al—4Mo—18TiN—Ti | 0.3 | 1050 | 1 | |
| 161 | 1Cu + (6Al—4Mo—Ti) | 30 | 1.2 | 6Al—4Mo—0.7Cu—Ti | 1.0 | 370 | 320 | |
| 162 | 22.5Cu + (6Al—4Mo—Ti) | 30 | 1.2 | 6Al—4Mo—16Cu—Ti | 1.0 | — | — | Weld-cracking |
| 163 | 11Ta + 3Al + (6Al—4Mo—Ti) | 10 | 0.9 | 8.5Al—4Mo—10Ta—Ti | 0.05 | 520 | | Craking in hardened region |

[1]Depth measured after 0.2 mm machining
[2]After 200 hours of endurance running test

EXAMPLE 10

Table 10 shows welding conditions used in the melt-hardening method according to the present invention, which is applied to rocker arms of automobile engines, and the member hardening characteristics. The tip end face of each rocker arm was subjected to the laser powder-padding process, using various hardening alloy elements shown in Table 10, and was then melt-hardened.

In Example 10, a Ti-6Al-4Mo alloy was used for sample members. While the to-be-hardened region was supplied with powder of hardening alloy elements of compositions shown in Table 10, pulverized to a particle size of 80 to 350 mesh, the laser powder-padding process was conducted with a laser output of 0.9 to 1.5 kW and a welding speed of 16 mm/sec. Helium gas was supplied as a shielding gas at a flow rate of 10 l/min. The aforesaid several hardening characteristics of the sample members, hardened in this manner, were measured. The measurement results are shown in Table 10.

Powder of hardening alloy elements, including copper added to the composition of the base metal, was deposited on the to-be-hardened region by laser powder padding process. Thereupon, when the copper content in the powder was relatively low, the Hv-number of the in place of copper, was used, the hardened layer depth and the hardness were found to be within their respective ranges provided by the present invention (Test No. 153). When the laser output was lowered, however, the hardened layer depth become so small that the hardened region cracked (Test No. 163). When powder of a higher tantalum content was used, the hardness of the hardened region increased (Test No. 154).

When a mixture of aluminum and cobalt was used as the hardening alloy elements, the hardened layer depth and the hardness were found to be within their predetermined ranges (Test No. 155). When the amount of cobalt was increased, the hardness of the hardened region increased further (Test No. 156).

Also, when Ti-31V-7.2Al-4Mo-0.5Ag alloy powder (Test No. 157) or Ti-11Al-22Mo alloy powder (Test No. 158) was used as the hardening alloy elements, a hardened layer depth and an Hv-number within the predetermined ranges of the invention were obtained. When powder of a nitride (TiN) was added to Ti-12Al-6Mo alloy powder, the hardened region showed a very high Hv-number of 1,050 (Test No. 159). Thus, in Example 10, all the sample members (Test Nos. 150 to 159) tested according to the method of the present invention was found to have a hardened layer depth and an Hvnumber within the predetermined ranges of the invention. Also, the depth of wear, after 200 hours of endurance running test, proved sufficiently small, thus ensuring a satisfactory life performance of each sample member, considering the hardened layer depth obtained by the process.

What is claimed is:

1. A method for manufacturing a wear-resistant member, comprising a step of melt-hardening the surface of a member made of a material selected from the group consisting of titanium and titanium alloy, while spraying the member surface with a plasma jet containing, as a working gas, a gas mixture of an inert gas and a hardening gas, thereby providing a Vickers hardness number of 390 to 1,200 and a hardened layer depth of 0.1 to 2.0 mm.

2. A method for manufacturing a wear-resistant member according to claim 3, wherein said Vickers hardness number ranges from 400 to 800, and said hardened layer depth ranges from 0.3 mm to 1.5 mm.

3. A method for manufacturing a wear-resistant member according to claim 1, wherein said plasma jet is sprayed by means of a torch including a center electrode, a first passage surrounding said center electrode, and a second passage surrounding said first passage, said first passage being supplied with said working gas, and said second passage being supplied with a shielding gas containing an inert gas and a hardening gas.

4. A method for manufacturing a wear-resistant member according to claim 3, wherein said torch further includes a third passage defined between said first passage and said second passage so as to surround said first passage, said first passage being supplied with a first gas mixture, as a working gas, containing at least said inert gas, and said third passage being supplied with a second gas mixture containing at least said hardening gas, so that said second gas mixture is caused to join a plasma jet produced in said first passage.

5. A method for manufacturing a wear-resistant member according to claim 3, wherein said hardening gas is formed of one or more gases selected from the group consisting of nitrogen, carbon dioxide, carbon monoxide, oxygen, methane, and ammonia.

6. A method for manufacturing a wear-resistant member according to claim 5, wherein said hardening gas is nitrogen, and said gas mixture contains nitrogen gas at a rate of 0.1 to 20% by volume.

7. A method for manufacturing a wear-resistant member according to claim 5, wherein said hardening gas is carbon monoxide, and said gas mixture contains carbon monoxide at a rate of 30% or less by volume.

8. A method for manufacturing a wear-resistant member according to claim 5, wherein said hardening gas is carbon dioxide, and said gas mixture contains carbon dioxide at a rate of 20% or less by volume.

9. A method for manufacturing a wear-resistant member according to claim 4, wherein said hardening gas of said second gas mixture is oxygen.

10. A method for manufacturing a wear-resistant member, comprising a step of mixing (i) at least one hardening alloy element selected from the group consisting of tin, boron, iron, chromium, nickel, manganese, copper, silicon, silver, tungsten, molybdenum, vanadium, columbium, tantalum, and zirconium, with (ii) at least one compound selected from the group consisting of carbides, nitrides and oxides to form a hardening mixture, and a step of applying said mixture to the surface of a member made of a material selected from the group consisting of titanium and titanium alloy, and a step of melt-hardening said member surface together with said hardening mixture, thereby forming a hardened surface layer on said member having a member surface Vickers hardness number of 390 to 1,200 and a hardened layer depth of 0.1 to 2.0 mm.

11. A method for manufacturing a wear-resistant member according to claim 10, wherein titanium is mixed with said hardening alloy elements.

12. A method for manufacturing a wear-resistant member, comprising a step of applying hardening alloy elements, formed of one or more elements selected from the group consisting of tin, boron, iron, chromium, nickel, manganese, copper, silicon, silver, tungsten, molybdenum, vanadium, columbium, tantalum, and zirconium, to the surface of a member made of a material selected from the group consisting of titanium and titanium alloy, and a step of melt-hardening said member surface together with said hardening alloy elements, while spraying the member surface with a hardening gas, thereby providing a Vickers hardness number of 390 to 1,200 and a hardened layer depth of 0.1 to 2.0 mm.

13. A method for manufacturing a wear-resistant member according to claim 12, wherein titanium is mixed with said hardening alloy elements, and the resulting mixture is applied to said member surface.

14. A method for manufacturing a wear-resistant member according to claim 12, wherein at least one compound from the group consisting of a carbide, a nitride, and an oxide is mixed with said hardening alloy elements, and the resulting mixture is applied to said member surface.

15. A method for manufacturing a wear-resistant member according to claim 12, wherein said hardening gas is formed of one or more gases selected from the group consisting of nitrogen, carbon dioxide, carbon monoxide, oxygen, methane, and ammonia.

* * * * *

UNITED STATES PATENT AND TRADEMARK OFFICE
CERTIFICATE OF CORRECTION

PATENT NO. : 4,902,359

DATED : February 20, 1990

INVENTOR(S) : TAKEUCHI et al

It is certified that error appears in the above-identified patent and that said Letters Patent is hereby corrected as shown below:

Column 35, line 19 (Claim 2), change "to claim 3" to

--to claim 1--.

Column 35, line 41 (claim 5), change "to claim 3" to

--to claim 1--.

Signed and Sealed this

Fifteenth Day of December, 1992

Attest:

DOUGLAS B. COMER

*Attesting Officer*  *Acting Commissioner of Patents and Trademarks*